United States Patent Office 3,753,905
Patented Aug. 21, 1973

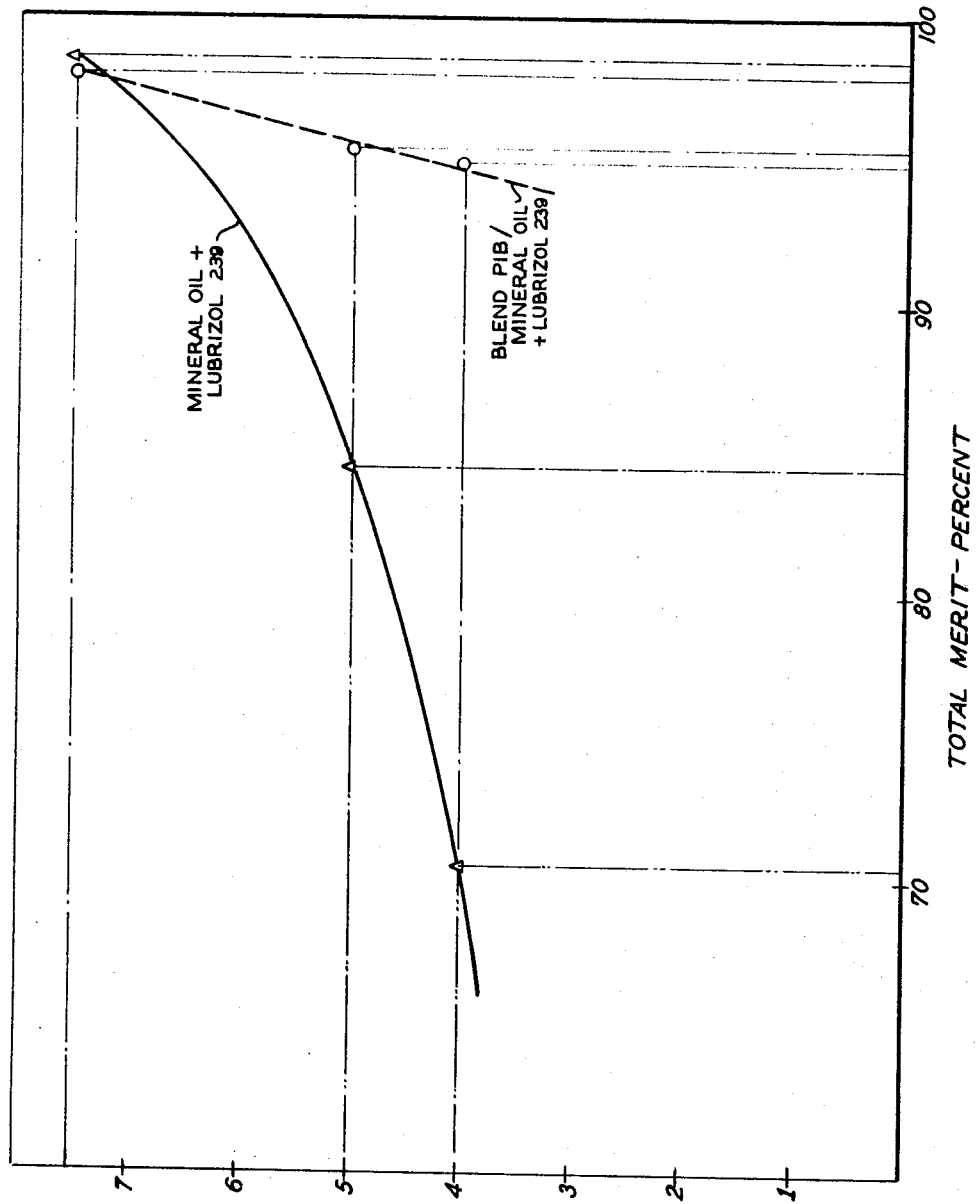

3,753,905
TWO CYCLE LUBRICATION
Georges Jules Pierre Souillard and Frederic Francois Paul Van Quaethoven, Wezembeek-Oppem, Belgium, assignors to Cosden Oil & Chemical Company, Big Spring, Tex.
Continuation-in-part of abandoned application Ser. No. 778,858, Nov. 25, 1968, which is a continuation of application Ser. No. 555,052, June 3, 1966. This application Sept. 18, 1970, Ser. No. 73,575
Int. Cl. C10l 1/16; C10m 1/32, 1/40
U.S. Cl. 252—33.4                            7 Claims

ABSTRACT OF THE DISCLOSURE

A lubricant which will be mixed with the liquid engine fuel is provided for a two-cycle engine, the lubricant comprising a major proportion of a polybutene, a minor proportion of a mineral oil and a minor proportion of an additive, such lubricant having the properties of resolving most of the problems attending two-cycle engine operation.

This application is a continuation-in-part of our copending application Ser. No. 778,858, filed Nov. 25, 1968, now abandoned which is in turn a streamlined continuation of Ser. No. 555,052, filed June 3, 1966.

This invention relates to lubrication of a two-cycle engine and particularly to a two-cycle and rotary engine lubricant comprising a mixture of a major quantity of at least 80% of a liquid polybutene with minor quantities of mineral oil and a lubricant additive; to a two-cycle engine fuel containing such lubricant mixture; and to operation of a two-cycle engine therewith.

For the two-cycle engine, we refer generally to the two-cycle spark-fired as well as rotative engines of the Wankel type; typically, useful for power lawnmowers and other power-operated garden equipment, engine combinations with chain saws, pumps, electrical generators, marine outboard engines and the like.

Outstanding problems of this type of engine which necessarily needs trouble-free lubrication to operate for substantial periods of time without constant attention, cured by the present invention are port clogging, spark plug fouling, piston ring sticking, rusting, lubrication failure of connecting rod and main bearings, general formation of carbon and varnish or so-called "lacquer" deposits upon working surfaces, and finally obnoxious production of smoke.

It has been most common in the art to use ordinary mineral oil lubricant for such engines which has resulted in ring sticking and tarry fouling and heavy contamination of engine parts to such degree as largely to discourage use of this type of engine for commercial purposes. It has also been proposed to use liquid polybutene for the advantage of complete decomposition under two-cycle combustion chamber conditions, leaving no tarry deposits even at moderate temperatures, but this lubricant fails adequately to protect moving parts such as bearings and leaves the engine susceptible to rapid corrosion, rust formation and bearing failure. Such additives as metallic or ashless types have been used wth either polybutene or mineral types of lubricant, but have been inadequate for their purposes to give tar-free lubrication of this type of engine or to stay put on the engine walls and bearings and, in some instances, have aggravated the deposition of tars and lacquers.

According to the present invention it is found that a lubricating composition comprising a major proportion of at least 80% polybutene mixed with minor quantities of mineral oil and further containing minor quantities of lubricant additives gives a demonstrated lubrication for this type of engine far superior to any of these components used alone in other combinations or even in substantially different proportions to solve the problems listed above for two-cycle or rotary engines in which the lubricant is added to the fuel.

The lubricant composition hereof in broadest aspect comprises a polybutene having a viscosity ranging between 30 SSU at 210° F. (2.0 cst. at 98.9° C.) and about 600 SSU at 210° F. (130 cst. at 98.9° C.), and having a molecular weight range of 250 to 800. The polybutene hereof may be any of the polybutenes available in liquid form in said viscosity range; it may be polybutene or polyisobutylene or mixtures thereof. Moreover, it is useful to use a hydrogenated polybutene sometimes for its better oxidation stability available therein as described in U.S. Pat. to Dyer, 3,100,808, issued Aug. 13, 1963.

A preferred method of forming the polybutene is shown in United States patent to Jackson, 2,957,930, issued Oct. 23, 1960. Such method forms a superior product in that the polybutene is formed more homogeneously in a narrow molecular weight range.

The minor quantity of mineral oil used herein has a useful viscosity in the range of about 50 to 500 SSU at 100° F. (2 cst. and 108 cst. at 37.8° C.). Any lubricating mineral oil can be used, but it is preferred to use a naphthenic base, such as a solvent-refined coastal oil as the mineral oil component thereof. As additive herein, known fuel additives are used, either the ash-forming type such as super-based metal complexes or ashless, such as fatty acid polyamide type of additive in which the fatty acid has from about 12 to 30 carbon atoms as shown in Benoit, 3,169,980, can be used. It is here preferred to use the ash-forming types, examples of which are described in U.S. Pats. 2,916,454, 2,972,579, 2,989,463, 3,015,320, 3,055,951, 3,090,753, 3,126,430, 3,130,160, 3,135,692, 3,178,368, 3,180,831 and 3,210,277.

A preferred additive is a super-based alkali earth metal petroleum sulfonate; typically, super-based calcium petroleum sulfonate which desirably is dissolved as a 20 to 40% solution in the oil as a solvent, the oil being either polybutene mineral oil or other organic oils such as a polyalkylene polyamine, but preferably the additive is first dissolved in one or both of the oils defined above. Useful commercial additives are Lubrizol 239, a calcium petroleum sulfonate having an alkaline number of approximately 60 mg. KOH/gr. and an average molecular weight of 480, suspended to the extent of about 30% in an aromatic mineral oil, said additive being further described in a U.S. Pat. to Mitacek et al., 3,085,798.

A preferred ashless type of additive is a combination of an alkylene polyamine, typically triethylene tetramine or tetraethylene pentamine with alkenyl succinic anhydride to form the corresponding polyamine imide thereof, the alkenyl substituent being a polymerized olefin of from two to about five carbon atoms having a molecular weight from about 100 to 3000, usually polymers of isobutylene or di- or tri- or tetraisobutylene. Such imides are disclosed in U.S. Pat. to Benoit, 3,310,492.

A general formulation of the lubricant mixture hereof comprises polyisobutylene in the range of 80 to 98% by volume, lubricant mineral oil in the range of 1 to 19.5% by volume and additive in the range of 0.5 to 10% by volume.

The lubricant composition hereof is added in conventional quantity to the engine fuel in a ratio variable from about 1 part of lubricant to 10 parts of gasoline up to about 1 part of lubricant to 100 parts of gasoline, preferably 1:20 to 1:50 by volume. The fuel is typically gasoline but other commercial fuel mixtures for two-cycle engines can be substituted.

Such composition, in contrast to ordinary use of either mineral oil or polybutene as two-cycle engine lubricant, either with or without additive, burns with superior lubrication of cylinder walls and bearings, maintaining an effective lubricating film on the moving parts, leaving no tarry or lacquer deposit, and provides long term, trouble-free two-cycle operation.

Another important advantage of this composition is its unusually high additive response. Surprisingly, we have found that the mixture of polybutene with a conventional amount of additives and a small quantity of mineral oil provides lubrication of a two-cycle engine at high level engine performance even when the normal additive content is much reduced. For instance, in contrast, normal two-cycle engine operation with additive compound used with mineral oil in a conventional mixture gives decreased performance in direct proportion to reduction of the additive concentration.

A further advantage of the present invention is that the lubricant appears to greatly reduce or eliminate smokey exhaust. Moreover, such two-cycle engine stored for long periods following use of the present lubricant is found to be rust-free, not primarily because the additive may inhibit rust, but because it is believed the additive in the mixture of mineral oil and polybutene remains adhered to the metal surface over long storage periods to exert its full anti-rust effect.

It is common in the art to use polybutene as a synthetic lubricant per se, often with additives, but such polybutene is usually of substantially high molecular weight such as abot 10,000 to 20,000, and at least 5,000, because such polybutene is known to have or to provide an improved viscosity index to mineral lubricating oils. However, pure polybutene with or without additives such as suggested in a U.S. Pat. to Reimenschneider, 2,896,593, while it gives reduced tar deposition, tends to decompose in the hotter portions of the engine and thus provides no lubrication at such places where it is most needed. Hence, pure polybutene gives a high wear and ring sticking effect when used as a lubricant and is an inadequate lubricant per se for two-cycle engines.

On the other hand, a pure mineral oil used with an additive or even with a small quantity of polybutene i.e. less than 5%, as taught in a U.S. patent to Mitacek et al., 3,085,978, tends to leave about as much tarry deposit and provides a smokey exhaust, notwithstanding some improvement available due to some stabilization of the viscosity index as provided by the small quantity of polybutene. Particularly it is found, moreover, that the polybutene per se of this invention is of contrastingly low molecular weight of substantially light liquid character and is superior for present use in a two-cycle engine to the heavier polybutenes.

Finally, this combination of mineral oil with large quantity of polybutene and conventional additive is overall superior as a lubricant. For instance, in burning a conventional fuel composition consisting of 3% of an additive such as Lubrizol 239 dissolved in only 97% of polybutene as the lubricating oil, and added to a gasoline in ratio of 1 to 16 parts by volume, it was found after 200 hours of operation that rather severe burning had occurred in the engine bearings. In contrast, using the same engine again with one volume of lubricant to sixteen volumes of fuel, the lubricant consisting of 94% polybutene, 3% solvent-refined coastal oil and 3% of the same Lubrizol 239, additive A, and operating for a total of 1500 hours, it was found that the bearings were cleanly lubricated and there was no evidence of burning.

The following examples are offered by way of illustration and are not intended to be taken as limiting.

EXAMPLE I

Comparative tests were run on various fuel-oil compositions. In this particular example the "Mobylette Test" was applied. This test involves runs on a 49 cm.$^3$ Mobylette two-cycle engine under the following conditions:

Duration—100 hours
Speed—3,300 r.p.m.
Output—adjusted to provide proper fuel flow at specified speed
Fuel Consumption—10 cc. per 70 seconds +1-2 (±2) seconds
Oil to fuel ratio—1:16

The method is used to evaluate the following aspects of performance: exhaust port plugging, inlet port plugging piston ring sticking, spark plug fouling and deposits formed on the piston head, skirt, rings and cylinder heads.

In addition to a general evaluation with the foregoing points in mind, certain key ones of the features judged are compared in accordance with the so-called "2-stroke Merit Rating System." Under this system the following factors are evaluated: piston ring sticking; piston skirt condition (with respect to varnish deposit); inlet port condition (with respect to blockage); and exhaust port condition (with respect to blockage).

Maximum possible rating value obtainable under the 2-stroke Merit Rating System is 100. With respect to piston ring sticking, a free ring is accorded ten points, a sluggish ring nine points, and stuck rings are evaluated at seven points for up to 45° of sticking, with one unit being subtracted for every additional 45° of sticking. The result so obtained is multiplied by two, to make a maximum possible rating obtainable as twenty points for ring sticking evaluation.

With respect to inlet and exhaust port blocking, ten points is awarded if there is no obstruction of the port. If there is blockage, the percent area blocked is determined. Then from ten points is subtracted a figure determined by multiplying by ten the ratio of the area blocked to total area. The result is multiplied by two, to obtain the final evaluation of the inlet and exhaust port blockages. It is seen that the final possible total is twenty points for exhaust port evaluation and twenty points for inlet port evaluation.

A similar point award system is used with respect to piston skirt varnish deposit. A skirt with no deposit is awarded ten points. The points awarded a skirt carrying a varnish deposit depend upon the percentage area covered. The ratio of the percentage of area covered to the total piston area is multiplied by ten. The product so obtained is multiplied by a color factor, based on discoloration of the piston. The color factor table utilized is as follows:

Clean _____ 0
Light brown _____ ¼
Brown _____ ½
Dark brown _____ ¾
Black _____ 1

After multiplying by the color factor, the result obtained is subtracted from ten and multiplied by two. The maximum possible point award is again seen to be twenty.

The tests were conducted with the following five compositions being utilized as the lubricant (the compositions being given by volume):

(1) 100% mineral oil
(2) 97% mineral oil and 3% Lubrizol 239
(3) 100% polybutene
(4) 97% polybutene and 3% Lubrizol 239

(5) 94% polybutene, 3% of Lubrizol 239 and 3% of 75-solvent refined coastal oil having physical characteristics as set forth in Table I.

The test results are presented in the following table, with the results obtained with a particular composition being horizontally aligned adjacent the numeral used above in listing that composition:

(3) 97% polybutene and 3% Lubrizol 239
(4) 97% hydrogenated polybutene and 3% Lubrizol 239
(5) 90% polybutene and 5% Lubrizol 239 and 5% of 200-solvent refined coastal mineral oil (i.e. 200 SSU at 100° F.)
(6) 92% polybutene, 5% Lubrizol 239 and 3% 200-solvent refined coastal mineral oil

TABLE I

| Fuel-lubricant Composition Number | Viscosity, cst. at 50° C. | Viscosity, SSU at 100° F. | Viscosity, SSU at 210° F. | Ring sticking Ring 1 | Ring sticking Ring 2 | Piston skirt | Inlet port | Exhaust port | Merit value |
|---|---|---|---|---|---|---|---|---|---|
| 1 | 66.2 | 616.8 | 60.98 | 20 | 20 | 14.25 | 20 | 12 | 86.25 |
| 2 | 64.4 | 582.1 | 60.62 | 20 | 20 | 18.00 | 20 | 20 | 98.00 |
| 3 | 63.9 | 550.7 | 66.36 | 0 | 20 | 11.00 | 20 | 20 | 71.00 |
| 4 | 64.7 | 552.6 | 66.73 | 20 | 20 | 19.00 | 20 | 20 | 99.00 |
| 5 | 60.07 | 514.4 | 64.91 | 20 | 20 | 19.00 | 20 | 20 | 99.00 |

As far as the merit rating is concerned, compositions (2), (4) and (5) give the best results. In fact, compositions (2) and (5) are the best lubricant because composition (4) which is a combination of 3% additive Lubrizol 239 with pure polybutene led to some weakness in the bearings' behaviour after completion of the Mobylette test.

EXAMPLE II

A comparative engine operation test with various fuel-lubricant compositions was conducted. The test used is the so-called "Vespa Test." It involves operation of a 150 cm.³ Vespa two-cycle engine under constant speed for a total of thirty hours, subsequent to a five hour break-in period. The operating conditions are as follows:

Duration—30 hours
Speed—3,750 r.p.m. +/− 20 r.p.m.
Output—adjusted to provide proper fuel flow at specific speed
Fuel consumption—25 cc. in 45 seconds
Oil to fuel ratio—1:20

At the end of the Vespa test, the lubricating performance is judged from the following points of view: port clogging, spark plug fouling, piston ring sticking, rusting of connecting rods and main bearings and formation of carbon and varnish deposit (sometimes referred to as "lacquer deposit").

In addition to a general evaluation with the foregoing points in mind, the merit rating system explained in Example I was applied to evaluation of the following points: piston ring sticking, piston skirt condition, inlet and outlet port condition.

In the comparative test of this example, thirteen fuel-lubricant compositions were tested. They are identified as follows (all by volume):

(1) 97% paraffinic mineral oil and 3% Lubrizol 239 [1]
(2) 97% polybutene and 3% Lubrizol 239
(7) 90% polybutene, 5% Lubrizol 239 and 5% 100-solvent refined coastal mineral oil
(8) 90% polybutene, 5% Lubrizol 239 and 5% of 75-solvent refined coastal mineral oil
(9) 93% polybutene, 4% Lubrizol 239 and 3% of 200-solvent refined coastal oil
(10) 94% polybutene, 3% Lubrizol 239 and 3% of 200-solvent refined coastal oil
(11) 94% polybutene, 3% Lubrizol 239 and 3% of 75-solvent refined coastal oil
(12) 94% polybutene, 3% Lubrizol 239 and 3% of 500-solvent refined coastal oil
(13) 94% polybutene, 3% Lubrizol 239 and 3% of 75-solvent refined coastal oil Table II indicates merit rating results of this example. The results for each of the above-identified compositions are aligned horizontally in the table adjacent to the numeral utilized above in the listing of such composition.

TABLE II

| Fuel-lubricant Composition Number | Viscosity, cst. at 50° C. | Viscosity, SSU at 100° F. | Viscosity, SSU at 210° F. | Ring sticking Ring 1 | Ring sticking Ring 2 | Piston skirt | Inlet port | Exhaust port | Merit value |
|---|---|---|---|---|---|---|---|---|---|
| 1 | 62.9 | 581.2 | 60.62 | 19.0 | 20 | 17.5 | 20 | 16 | 92.50 |
| 2 | 64.7 | 552.6 | 66.73 | 0.0 | 20 | 17.5 | 20 | 20 | 77.50 |
| 3 | 66.2 | 540.5 | 68.60 | 0.0 | 20 | 16.5 | 20 | 17 | 73.50 |
| 4 | 60.9 | 540.0 | 63.10 | 4.0 | 20 | 17.5 | 20 | 18 | 79.50 |
| 5 | 62.4 | 535.45 | 65.64 | 19.0 | 20 | 18.0 | 20 | 15 | 93.00 |
| 6 | 63.3 | 546.1 | 66.36 | 19.0 | 20 | 18.5 | 20 | 20 | 97.50 |
| 7 | 59.4 | 508.2 | 64.55 | 18.0 | 20 | 17.5 | 20 | 18 | 93.50 |
| 8 | 57.7 | 492.9 | 63.83 | 18.0 | 20 | 18.0 | 20 | 19 | 95.00 |
| 9 | 63.2 | 544.2 | 66.00 | 19.5 | 20 | 19.0 | 20 | 19 | 92.00 |
| 10 | 62.8 | 540.5 | 66.00 | 14.0 | 20 | 19.0 | 20 | 19 | 92.00 |
| 11 | 60.0 | 514.4 | 64.91 | 19.5 | 20 | 18.5 | 20 | 20 | 98.00 |
| 12 | 64.7 | 559.9 | 66.73 | 18.0 | 20 | 19.0 | 19 | 19 | 95.00 |
| 13 | 60.0 | 514.4 | 64.91 | 19.5 | 20 | 19.0 | 20 | 19 | 97.50 |

While a mixture of only polybutene with 3% Lubrizol 239 is a good lubricant for a Mobylette engine type as far as the merit rating is concerned, the results with the first four compositions stated hereabove show that the combination of any type of polybutene with the additive Lubrizol 239 gives poor lubrication of the Vespa two-stroke engine when compared to a conventional mixture of mineral oil with the same percentage of Lubrizol 239 additive.

Tests performed with the compositions (5) to (8) show that the addition of a small amount of a mineral oil greatly improves the lubricating performance of a polybutene-additive Lubrizol 239 mixture as of compositions (2) to (4). The results obtained with compositions (9) to (13) show that all of them have excellent lubricating properties, especially compositions (11) and (13) which contain 3% of a mineral oil of 75 SSU viscosity at 100° F. Moreover, the Vespa engine was run during 500 hours with each of the compositions (5) to (13) and the bearings were still in good mechanical condition.

---

[1] Lubrizol 239 characteristics:
Viscosity, SSU at 210° F. _____ 150
Ca content, percent weight _____ 3.4
S content, percent weight _____ 2.0

EXAMPLE III

Tests were run on another Vespa engine under the same conditions as those used in Example I.

This other Vespa engine is the new Vespa engine of 150 cc. with the rotative mixture distribution which allows the use of an oil/gasoline ratio of only 1/50.

The lubricants had the following compositions:

(1) 92.5% mineral oil and 7½% Lubrizol 239
(2) 95% mineral oil and 5% Lubrizol 239
(3) 96% mineral oil and 4% Lubrizol 239
(4) 89.5% polybutene, 3% mineral oil and 7½% Lubrizol 239
(5) 92% polybutene, 3% mineral oil and 5% of Lubrizol 239
(6) 93% polybutene, 3% mineral oil and 4% of Lubrizol 239

Table III summarizes the data obtained:

TABLE III

| Fuel-lubricant Composition Number | Viscosity at 50° C., cst. | Ring sticking Ring 1 | Ring sticking Ring 2 | Piston skirt | Inlet port | Exhaust port | Merit value |
|---|---|---|---|---|---|---|---|
| 1 | 175 | 20.0 | 20 | 19.5 | 20 | 19 | 98.50 |
| 2 | 177 | 12.0 | 20 | 14.5 | 20 | 18 | 84.50 |
| 3 | 180 | 0.0 | 20 | 16.5 | 19 | 15 | 70.50 |
| 4 | 139 | 20.0 | 20 | 18.0 | 20 | 20 | 98.00 |
| 5 | 140 | 19.5 | 20 | 16.0 | 20 | 20 | 95.50 |
| 6 | 137.5 | 19.5 | 20 | 17.5 | 20 | 18 | 95.00 |

From this data we can immediately see that the lubricating performance of the compositions, following the present invention, remain at a very high level despite the reduction of their additive content and that this is not the case with a conventional lubricant.

EXAMPLE IV

Comparative tests were run with four different compositions on a 3-cylinder two-stroke SAAB engine of 841 cm.³.

This test is the so-called SAAB corrosion test in a refrigeration chamber. It involves the following conditions:

oil/fuel ratio, 3/100 by volume
engine put in a room and kept at −10° C.
engine started twice in twenty-four hours with at least five hour intervals until twenty-five starts have been made
each start run for three minutes at 2000–3000 r.p.m.
after the twenty-five starts the temperature in the refrigeration chamber is raised to +2° C. and the engine is kept in that condition for fourteen days
engine is dismantled and different parts are subjected to judgment Table IV gives the results obtained with the different compositions. The 340 D as disclosed in the table is an ashless additive sold by Oronite which is a higher fatty acid polyamide of a polyamine of a fatty acid having about 12 to 30 carbon atoms as described in a patent to Benoit, 3,169,980. It has a viscosity of 310 SSU at 210° F. and a nitrogen content of 6.6% by weight. The Lubrizol 224 also disclosed in the table is an ashless additive imide reaction product of a polyamine and an succinic anhydride as described in a patent to Benoit, 3,310,-492, which has a viscosity of 550 SSU at 210° F., a density of 0.93 and a nitrogen content of 2.7% by weight.

EXAMPLE V

Comparative tests were run on a Johnson engine having the characteristics described below:

cylinders—two
cylinder capacity—145 cc.
horsepower—5.5 Hp. at 4000 r.p.m.

The engine was run in a fifty gallon tank containing water kept at a temperature below 20° C. The following conditions were adopted:

running in period—five hours during which the speed and the load are progressively increased up to the values used during the test
test duration—100 hours
speed—3300±50 r.p.m.
fuel consumption—25 cc. during a period of 34±2 seconds
oil/gasoline mixture—5/100

The load is a function of the speed and the consumption.

The test is interrupted before the one hundred hours is completed if the speed and the consumption cannot be maintained in the above described limits. During the test, the speed, the consumption and the horsepower are registered every two hours.

Between two tests the engine is completely dismantled and carefully cleaned. New pistons and spark plugs are mounted before each test. At the end of the test the lubricating performance is judged from the following points of view: outlet port clogging, piston ring sticking, piston skirt coloration.

A conventional lubricant and a polybutene-based lubricant were tested. The following Table V gives the results which show that the best performance is obtained with the polybutene-based lubricant.

TABLE V

| Lubricant point examined | 97% paraffinic oils, 3% LZ 239 | | 94% polybutene, 3% mineral oil, 75 SSU at 100° F., 3% LZ 239 | |
|---|---|---|---|---|
| | Cylinder 1 | Cylinder 2 | Cylinder 1 | Cylinder 2 |
| Piston ring: | | | | |
| 1 | Free | Free | Free | Free. |
| 2 | do | do | do | Do. |
| 3 | do | do | do | Do. |
| Port inlet | do | do | do | Do. |
| Port outlet | 20% clogged | 10% clogged | do | Do. |
| Piston skirt color. | Traces of 1; 25% of ¾; 0 of ½; 5% of ¼ | Traces of 1; 15% of ¾ | Traces of 1; 5% of ¾ | Traces of 1. 10% of ¾. |
| Total merit | 92/100 | 94.25/100 | 99.25/100 | 98.5/100. |

The test results as reported in Table V are based upon 2-stroke Merit Rating System as specifically defined in previous examples.

EXAMPLE VI

A lubricant composition containing 94% of polybutene, 3% of a mineral oil (75 SSU at 100° F.) and 3% of the

TABLE IV

| | Mineral oil plus 8% 340 D | Polybutene plus 20% mineral oil plus 8% of 340 D | Mineral oil plus 4% LZ 239 plus 4% LZ 224 | Polybutene plus 20% mineral oil plus 4% LZ 239 plus 4% of LZ 224 |
|---|---|---|---|---|
| Piston | Scuffing | Good | Scuffing | Good. |
| Cylinder | do | do | Rust; some scuffing | Traces of rust. |
| Bearings | Tendency to stick | do | Tendency to stick | Good. |

Lubrizol 239 additive as previously defined, was tested on a rotative Wankel engine, type KKM–502.

The engine was run for one hundred hours, and during this period of time no trouble occurred. The deposits were significantly reduced, while the lubrication of the engine remained fully satisfactory.

The use of such a lubricating composition did not influence at all the power output curve of the engine, which was established to be between 2000 and 6000 r.p.m.

EXAMPLE VII

Comparative tests were run on a Vespa engine of the type defined in Example II using a conventional lubricant and a polybutene-based lubricant, each used at a concentration of 5% in the lubricant-fuel mixture. The exhaust gases were passed through a Hartridge smoke meter which measures the decrease of intensity of a light beam passing through the smoke moving in a conduit.

The Hartridge smoke meter is calibrated from 0 to 100, the lower value corresponding to the least opaque exhaust.

Cooperative test results are as follows:

TABLE VI

| Lubricant | Hartridge index | | |
|---|---|---|---|
| 97% mineral oil plus 3% LZ 239 | 45 | 35 | 40 |
| 94% polybutene, 3% mineral oil (75 SSU at 100° F.), 3% LZ 239 | 15 | 10 | 10 |

A considerable decrease of the opacity of the exhaust is thus to be noted when a polybutene-based lubricant is used. Moreover, it is noted that the typical odor of "burned oil" has disappeared.

EXAMPLE VIII

Compositions identified as A and B which are typical of the compositions of this invention were critically compared to known compositions C and D, the results being summarized in the table identified as Table VII.

Composition A: 6.5 volume percent of mineral oil plus 1.7 volume percent Ca sulfonate plus 92 volume percent polybutene Composition B: 5 volume percent mineral oil plus 1 volume percent Ca sulfonate plus 94 volume percent polybutene Composition C: 98.5 volume percent mineral oil plus 1 volume percent Ca sulfonate plus 0.5 volume percent polybutene Composition D: 97.6 volume percent mineral oil plus 1.6 volume percent Ca sulfonate plus 0.8 volume percent polybutene

TABLE VII

| Composition | Viscosity SSU at 100° F. | Viscosity SSU at 210° F. | Ring sticking | | Piston skirt | Inlet port | Exhaust port | Merit value |
|---|---|---|---|---|---|---|---|---|
| | | | Ring 1 | Ring 2 | | | | |
| A | 546 | 66.36 | 19.0 | 20.0 | 18.5 | 20 | 20 | 97.50 |
| B | 514.4 | 64.91 | 19.5 | 20.0 | 18.5 | 20 | 20 | 98.00 |
| C | 599.7 | 61.02 | 19 | 20.0 | 17 | 20 | 16 | 92 |
| D | 601.5 | 61.72 | 19 | 20.0 | 17.75 | 20 | 16.50 | 93.25 |

The comparison of the performance of compositions A and B, typical compositions as claimed in this invention are obviously superior and have a much lower tendency to deposit lacquer upon the piston skirts and tars upon the exhaust ports when compared to compositions C and D.

The beneficial results of applicants' three-element lubricant composition comprising a major quantity of polybutene, a minor quantity of mineral oil and a common commercial additive such as Lubrizol 239, as identified above, is shown in Table III and others to be markedly superior to a good binary lubricant mixture of mineral oil and the same Lubrizol 239 for two-cycle engine performance. Particularly the results set forth in Table III based on Example III is illustrated graphically in the attached drawing wherein the percent additive is plotted against the total merit of the composition as a lubricant, Particularly the drawing shows that the very high lubricating characteristics initially present are still available in the ternary mixture despite the quantity of additive being markedly reduced; indicating thereby a very high additive response in applicants' lubricant. For instance, the lubrication merit approaching 100% in both compositions where Lubrizol 239 is present as additive in quantity exceeding 7% is present. However, when this additive is reduced to 5%, the lubricating merit is quickly lowered in the binary mixture with mineral oil to about 84% down to about 70% and then goes lower when the additive quantity is reduced to about 4%. In applicants' composition the reduction of the additive from 7% to 5% reduces the merit only to a 96% rating, and further reduction to 4% only down to about a 93% rating, indicating the high lubricating level still available despite radical reduction of the additive content.

As thus described, a lubricating composition predominantly polybutene with minor quantities of ordinary mineral oil and a normal quantity of an additive is outstandingly improved with respect either to a mineral oil or polybutene used alone, or a mineral oil containing an additive, or polybutene containing an additive, or even a mineral oil mixed with polybutene and no additive, any binary mixtures used for lubricating a two-cycle engine.

What is claimed is:

1. A lubricant for two-cycle and rotative engines including the Wankel engine consisting essentially of a major proportion, at least 80%, of a liquid polybutene having a molecular weight in the range of 250 to 800, and a viscosity ranging from 30 to 600 SSU at 210° F., a minor proportion of mineral lubricating oil and a minor proportion of a lubricant additive selected from the group consisting of super-based alkali earth metal petroleum sulfonate, an imide of an alkenyl succinic anhydride and a polyalkylene polyamine, and an amide of a higher fatty acid and a polyalkylene polyamine, the said polyalkylene polyamine being selected from the group consisting of tri-lower alkylene tetramine and tetra-lower alkylene pentamine, the alkenyl group of said succinic anhydride having a molecular weight in the range of about 400 to 3000 and the higher fatty acid having from twelve to thirty carbon atoms.

2. The lubricant as defined in claim 1 wherein the polybutene is polybutene hydrogenated to substantially colorless form.

3. The lubricant defined in claim 1 wherein the polybutene is polybutene having a viscosity in the range of 30 SSU at 210° F. up to about 600 SSU at 210° F., and the mineral oil has a viscosity in the range of 50 to 500 SSU at 100° F.

4. The lubricant as defined in claim 1 wherein the polybutene is present in quantity ranging from 80 to 98% of the composition, the mineral oil is present in quantity ranging from 1 to 19.5% of the composition, and the additive is present in quantity ranging from 0.5 to 10% of the composition, all percentages being by volume.

5. The lubricant as defined in claim 1 consisting essentially of polybutene having a molecular weight in the range of 250 to 800 and a viscosity in the range of 30 to 600 SSU at 210° F. in quantity of 80 to 98%, solvent-refined coastal naphthenic base mineral oil having a viscosity in the range of 50 to 500 SSU at 100° F. in quantity of 1 to 19.5%, and a super based-calcium petroleum sulfonate in quantity of 0.5 to 10%, the proportions being by volume.

6. Motor fuel for two-cycle and rotative engines including the Wankel engine comprising gasoline containing a lubricant in proportion of 10 to 100 volumes of gasoline per volume of lubricant, said lubricant consisting essentially of a major proportion, at least 80%, of a liquid polybutene having a molecular weight in the range of 250 to 800, and a viscosity ranging from 30 to 600 SSU at 210° F., a minor proportion of mineral lubricating oil and a minor proportion of a lubricant additive selected from the group consisting of super-based alkali earth metal petroleum sulfonate, an imide of an alkenyl succinic anhydride and a polyalkylene polyamine, and an amide of a higher fatty acid and a polyalkylene polyamine, the said polyalkylene polyamine being selected from the group consisting of tri-lower alkylene tetramine and tetra-lower alkylene pentamine, the alkenyl group of said succinic anhydride having a molecular weight in the range of about 400 to 3000 and the higher fatty acid having from twelve to thirty carbon atoms.

7. The fuel composition as defined in claim 6 wherein the polybutene is present in quantity ranging from 80 to 98% of the lubricant composition, the mineral oil is present in quantity ranging from 1 to 19.5%, and the additive ranges in quantity of from 0.5 to 10%, all percentages of the lubricant being by volume.

References Cited

UNITED STATES PATENTS

| | | | |
|---|---|---|---|
| 2,896,593 | 7/1959 | Riemenschneider | 44—80 X |
| 3,085,978 | 4/1963 | Mitacek et al. | 44—58 X |
| 3,090,822 | 5/1963 | Voltz | 252—59 X |
| 3,169,980 | 2/1965 | Benoit | 252—51.5 A |
| 3,310,492 | 3/1967 | Benoit | 252—51.5 A |

DANIEL E. WYMAN, Primary Examiner

W. J. SHINE, Assistant Examiner

U.S. Cl. X.R.

44—51, 58, 63, 66, 80; 252—51.5 A, 59